United States Patent

Kinnerud et al.

[11] 3,891,464
[45] June 24, 1975

[54] ELECTRIC ACCUMULATOR WITH CHIEFLY PLANE PLATES

[75] Inventors: Verner Elof Johannes Kinnerud; Bernt Oskar Gerhard Svensson, both of Oskarshamn, Sweden

[73] Assignee: Svenska Ackumulator Aktiebolaget Jungner, Oskarshamn, Sweden

[22] Filed: Nov. 7, 1973

[21] Appl. No.: 413,742

[30] Foreign Application Priority Data
Nov. 14, 1972 Sweden............ 14787/72

[52] U.S. Cl. .......... 136/145; 136/79; 136/80; 136/81; 136/143
[51] Int. Cl. ........................................ H01m 39/02
[58] Field of Search .......... 136/79, 80, 81, 143, 145

[56] References Cited
UNITED STATES PATENTS

| | | | |
|---|---|---|---|
| 1,892,288 | 12/1932 | Shipp | 136/81 |
| 2,603,596 | 7/1952 | Vangsner | 136/80 |
| 3,264,140 | 8/1966 | Gohle | 136/81 |
| 3,443,995 | 5/1969 | Halsall et al. | 136/79 |
| 3,457,112 | 7/1969 | Rebin | 136/26 |

*Primary Examiner*—Winston A. Douglas
*Assistant Examiner*—John F. Niebling
*Attorney, Agent, or Firm*—Sughrue, Rothwell, Mion, Zinn and Macpeak

[57] ABSTRACT

Electric accumulator having plane plates which in their upper part have plane terminal lugs, the plates being arranged in parallel and with alternately placed positive and negative plates intermediate flexible separator rods extending up between the terminal lugs, said lugs exhibiting one or more portions projecting from the plane surface which subject the separator rods to a bending moment, thus generating friction forces which retain the separator rods in fixed position between the plates.

4 Claims, 3 Drawing Figures

PATENTED JUN 24 1975      3,891,464
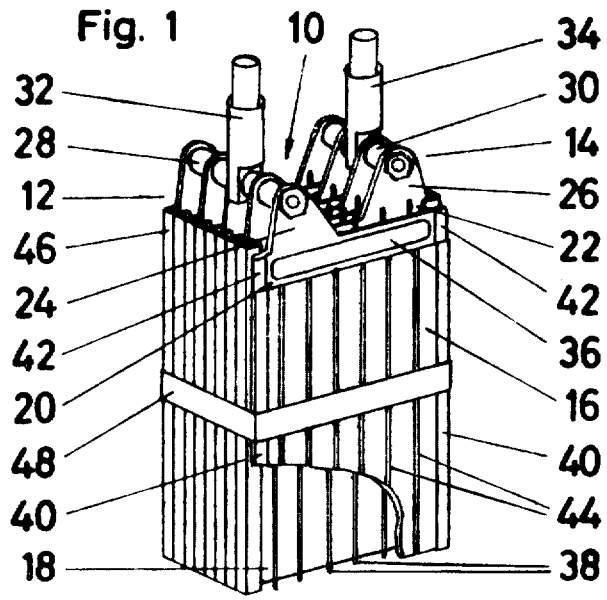
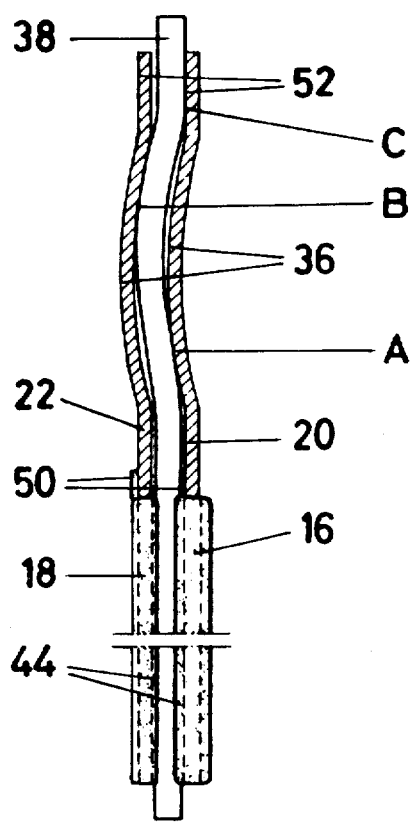
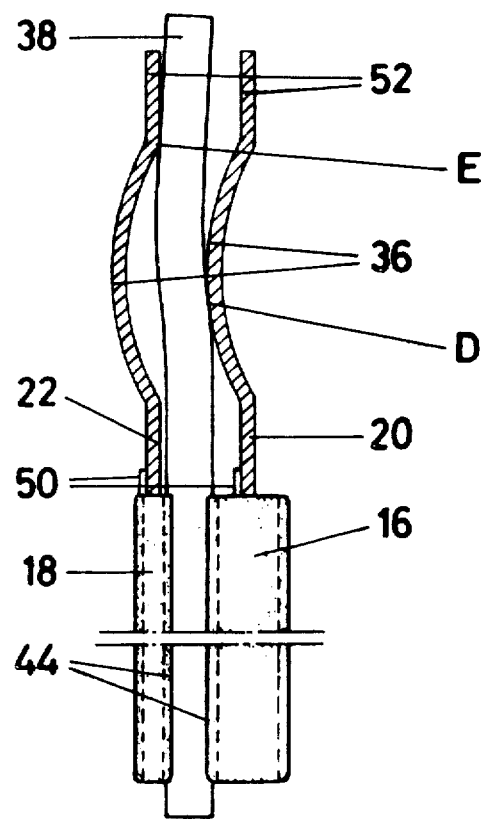

ELECTRIC ACCUMULATOR WITH CHIEFLY PLANE PLATES

This invention relates to an electric accumulator with chiefly plane plates which in their upper part have chiefly plane terminal lugs and which are arranged in parallel in an accumulator vessel with alternately placed positive and negative plates. Between the plates there are a number of flexible separator rods extending up between the terminal lugs.

This type of accumulator is used chiefly for alkaline accumulators but is in principle usable for all accumulators with chiefly plane plates. The plates are generally so-called pocket plates, each of which is composed of a number of pockets or containers containing positive or negative electrochemically active material. Other types, such as sintered plates, which consist of a porous sintered body with electrochemically active material embedded in the pores, and for example powder-pressed plates, may also occur. At their top the plates have a terminal lug through which current generated in the plate is led off or charging current is introduced. A number of plates with positive electrochemically active material and a number of plates with negative electrochemically active material are joined together individually by means of screw joints or welding to form a positive and negative group of electrodes respectively. A group of electrodes of this kind of each polarity is jointed to form a complex of electrodes with alternately placed positive and negative plates.

Plates of different polarity must, however, be separated from one another in order that contact between the various plates, with consequent short-circuiting, shall be avoided. Many different types of separation arrangement have been used for this purpose. The now commonest type of separators for alkaline accumulators consists of plastic or hard-rubber rods, alone or in combination with edge separators of mostly U-shaped plastic or hardrubber strips. Perforated and corrugated or ribbed flat separators of, for example, polyvinyl chloride are also used. Vertically placed separator rods between the plates, however, have the advantage that they more easily allow any sludge deriving from the plates to fall to the bottom of the accumulator vessel and any gas developed in the accumulator to escape. They are also considerably cheaper in material cost than flat separators.

The separator rods are made, for example, with circular, square or other optional cross-section. The thickness of rod varies from about 1.5 mm for accumulators for high load to about 3.5 mm for accumulators for low load. The length of rod depends on the height of the electrodes and the type of accumulator. They are usually made slightly greater in length than the height of the plates including the terminal lug.

A number of separator rods adapted to the width of the electrodes and type of accumulator, for example 4–10 rods, are placed in each space between a positive and a negative plate. Generally grooves or recesses for the separator rods are pressed or rolled into the plate. The edges of the plates are often insulated with U-shaped plastic of hardrubber strips. A thin band is usually rabbeted or welded around the electrode complex.

Accumulators of this type are provided with an electrolyte which can freely circulate between the plates. The electrolyte must entirely cover the part of the plates which contains active material, and only a part of the terminal lugs may be above the electrolyte level. The electrolyte generally has a density exceeding the density of the separator rods in use, so that the latter can flow up towards the surface of the electrolyte if they are not sufficiently rigidly clamped between the plates. The commonly used alkaline electrolyte, which is an aqueous solution of potassium hydroxide, generally has a density of about 1.2 $g/cm^3$. The separator rods may be made, for example, of polypropylene with a density of about 0.9 $g/cm^3$ or polystyrene with a density of about 1.05 $g/cm^3$, so that they are noticeably lighter than the electrolyte. Owing to differences of tolerance between the various separator rods and the plates certain separator rods may be loosely attached and, in the case of knocks or vibrations to which the accumulator is sometimes subjected, their position may be disturbed with the consequent risk of short-circuit between the plates.

In the manufacture of accumulators the plates are generally furnished with an active material in uncharged state. On charge the positive active material, in particular, increases in volume so that the plates swell. Due attention must be paid to this in manufacture and plates must be made with less thickness than that for which they are intended in the functioning accumulator after the latter has been charged. The separator rods, which are placed in the electrode complex before it is subjected to the first charge, will therefore, during handling of the electrode complex in manufacture, be even more loosely attached between the plates than in the final accumulator. They may therefore readily fall out of the electrode complex or their position in it may be disturbed in the course of manufacture.

Earlier an attempt has been made to avoid these drawbacks by using separator rods which are bent to hairpin shape. In the mounting of these rods the limbs of the rods are entered from below into the spaces on each side of a plate in the electrode complex. The rods can not flow up between the plates. These separator rods, however, are more expensive to manufacture than simple separator rods. They are also more difficult to mount, which adds to the expense of manufacture. They are also unsuited for mechanical mounting.

In an accumulator made in accordance with the present invention, however, the separator rods are well fixed between the plates and their position is not disturbed either during manufacture or during operation of the accumulator. This has been achieved through the fact that the terminal lugs exhibit one or more portions projecting from the plane surface, which subject the separator rods to a bending moment and, through the forces of friction arising therefrom, keep the separator rods in fixed position between the plates.

The portions projecting from the plane surface of the terminal lugs may occur on both sides of a terminal lug. Plates with projecting portions on only one side of the terminal lugs, furthermore, can be placed so that the projecting portions are directed in different directions in the accumulator. According to a preferred embodiment, however, the projecting portions of all terminal lugs are directed in the same direction in the accumulator. The projecting portions thus cooperate in an admirable manner, as will be described in greater detail below.

An especially suitable embodiment is characterized in that each terminal lug has a single longitudinal projecting portion essentially perpendicular to the longitudinal direction of the separator rod. A portion of this kind can be shaped so as to enter into contact with all separator rods in the adjacent space between the plates.

The projecting portions of the terminal lugs may be made in several different ways. One can, for example, use plane terminal lugs with one ore more bosses of suitable material attached. Moulded or cast terminal lugs are also conceivable. Slots can be cut out of the plane terminal lug with tongues which are bent over its surface, etc. From the current conduction aspect, however, it is most advantageous that there should be no interruptions in the form of cuttings, holes or the like in the terminal lug. A suitable embodiment is that the portions projecting from the plane surface of the terminal lugs are produced by pressing the material to convex form. The terminal lugs, which are often made of plate material, can then be manufactured by simultaneous pressing and cutting out of the terminal lug, and the pressing is then achieved practically free of charge. A pressing operation of this kind also makes the terminal lugs stiffer.

The invention will now be described with reference to the attached drawing.

FIG. 1 shows in perspective a partially cut-away electrode complex for an accumulator according to the invention.

FIG. 2 shows in cross-section two plates with intermediate separator rods according to the invention.

FIG. 3 shows an alternative to FIG. 2.

FIG. 1 shows an electrode complex 10 composed of a positive group of electrodes 12 and a negative group of electrodes 14. Each group of electrodes is composed of a number of essentially plane plates 16, 18. Each plate 16, 18 has in its upper portion an essentially plane terminal lug 20, 22 with a projection 24, 26. These projections are jointed per group of electrodes by means of plate straps 28, 30 from each of which at least one positive or negative post 32, 34 respectively extends. The plate straps 28, 30 are shown in the figure as threaded bolts with nuts which hold together the plates in the groups of electrodes, but they can equally well consist of strips to which the projections 24, 26 of the terminal lugs 20, 22 are attached by means of welding.

Each terminal lug 20, 22 has one or more portions projecting from the plane surface, which are shown in the figure as a single longitudinal portion 36 essentially perpendicular to the longitudinal direction of separator rods 38 placed between the plates 16,18. For staying of the plates 16, 18 each plate has two edge strips 40 which, with a part 42, also grip the edge of the terminal lug 20, 22 of the respective plate. The terminal lug 20, 22 is thereby stayed in relation to the other part of the electrode so that, without yielding, it can produce a bending moment on the separator rods 38 in their contact with the projecting portion 36. In the figure the plates 16, 18 have pressed or rolled recesses 44 which serve as positions for the separator rods 38. These recesses 44 are situated opposite one another on both sides of the plate. The vertical side-edges of the plates 16, 18 are furnished with edge separators 46 and the electrode complex is held together by a thin band 48 of plastic or metal. The electrode complex is immersed in electrolyte in an accumulator vessel, not shown in the figure.

FIGS. 2 and 3 show in cross-section a positive plate 16 and a negative plate 18. Each plate 16, 18 has a terminal lug 20, 22 which is electrically connected to the remaining portion of the respective plate at 50. The connection at 50 can be effected, for example, to a tongue of the uppermost electrode pocket in a pocket electrode or to an electrode body in the form of metal netting, perforated plate or the like. The terminal lug may also be made in one piece integrally with the electrode body. Each terminal lug 20, 22 has a portion 36 projecting from the plane surface 52, the projecting portions being directed in the figures in the same direction in the accumulator. In the space between the two plates 16 and 18 a separator rod 38 is placed in such a way that it is guided by the recesses 44 in the side-surfaces of the plates.

FIG. 2 shows two relatively thin plates 16, 18. In this case the separator rod 38 enters into contact with the projecting portion 36 of the terminal lug 20 at A and is then bent away towards the terminal lug 22. The projecting portions 36 here consist of convexities in the material of the terminal lugs 20, 22 and the terminal lugs therefore exhibit a concavity on the side opposite to the projecting portion 36. The separator rod 38 comes into contact with the terminal lug 22 at B within this concavity and is therefore bent back and returns into contact with the terminal lug 20 at C. Since the material in the separator rod 38 is flexible but nevertheless has some resilience, friction forces which effectively retain the separator rod between the plates arise at points of contact A, B and C. Suitable materials for the separator rod are such as combine some flexibility and resilience, or spring force, with resistance to the electrolyte used in the accumulator. Examples of suitable materials for separator rods in alkaline accumulators are polypropylene, polystyrene and ebonite. Even if the resilience of the material should gradually diminish, the resulting change of shape of the separator rod would retain it in position.

FIG. 3 shows the condition if the positive plate 16 is considerably thicker than the negative plate 18. One then obtains a larger space between the terminal lugs 20, 22, and the points of contact between the separator rod 38 and the terminal lugs 20, 22 will be limited to points D and E. This as well creates sufficient forces of friction to retain the separator rod 38 in position. It will be readily realized that the same condition will prevail if the terminal lugs, instead of one or more convex pressings 36 of the material, have bosses or similar portions projecting from the terminal lugs.

What is claimed is:

1. In an electric accumulator with chiefly plane plates (16,18) which in their upper part have chiefly plane terminal lugs (20,22) and which are arranged in parallel with alternately placed positive and negative plates with intermediate flexible separator rods (38) which extend up between the terminal lugs (20,22), the improvement characterized in that the terminal lugs (20,22) have one or more portions (36) projecting from the plane surface which subject the separator rods (38) to a bending moment such that through the generated forces of friction between said projecting portions and said separator rods the separator rods (38) are held in a fixed position between the plates (16,18).

2. Electric accumulator according to claim 1, characterized in that the projecting portions (36) of all terminal lugs are directed in the same direction in the accumulator.

3. Electric accumulator according to claim 1, characterized in that each terminal lug has a single longitudinal projecting portion (36) essentially perpendicular to the longitudinal direction of the separator rods (38).

4. Electric accumulator according to claim 1, characterized in that the portions (36) projecting from the plane surface (52) of the terminal lugs are produced by pressing of the material to convex form.

* * * * *